United States Patent [19] | [11] 4,237,932
Johnson | [45] Dec. 9, 1980

[54] CONTROL ARRANGEMENT FOR A DAMPER

[75] Inventor: Gilbert H. Johnson, Louisville, Ky.

[73] Assignee: American Air Filter Company, Inc., Louisville, Ky.

[21] Appl. No.: 57,287

[22] Filed: Jul. 13, 1979

Related U.S. Application Data

[63] Continuation-in-part of Ser. No. 733,991, Nov. 20, 1976, abandoned.

[51] Int. Cl.[3] .............................................. F16K 31/02
[52] U.S. Cl. ................................ 137/624.18; 251/30; 251/134
[58] Field of Search ...................... 137/624.11, 624.18, 137/624.2, 624.13; 251/30, 129, 134; 431/62

[56] References Cited

U.S. PATENT DOCUMENTS 3,898,997 8/1975 Kelley ............................ 137/624.18

*Primary Examiner*—Alan Cohan
*Attorney, Agent, or Firm*—Ralph B. Brick

[57] ABSTRACT

A damper control arrangement wherein a damper blade opens and closes a flow-through orifice in response to selective moving means, the selective moving means moving the damper blade a preselected distance from the orifice opening to vary the opening of the orifice for a predetermined period of time prior to moving the damper blade to a fully open position.

1 Claim, 5 Drawing Figures

CONTROL ARRANGEMENT FOR A DAMPER

RELATED APPLICATION

This application is a continuation in-part of U.S. Ser. No. 733,991 filed Nov. 20, 1976 and now abandoned.

BACKGROUND OF THE INVENTION

This invention relates to a damper control arrangement and in particular relates to a damper control arrangement including means to selectively control the opening area of a flow through orifice. Even more particularly, this invention relates to a damper control arrangement which provides a selectively buffered transition in a system when starting or stopping the flow of fluid in the system.

In many applications it is desirable to provide for a buffered transition when removing a fluid system from or returning a fluid system to different preselected fluid flow conditions. For example, in the filtering of a gas stream using cloth fabric bags, it is desirable to avoid a sudden surge of gas when a gas controlling damper arrangement is activated, the sudden surges of gas causing the fabric filter bags to snap and consequently weaken the fabric material. This weakening of the fabric is intensified when the fabric material is one containing glass fibers.

Prior art damper arrangements, such as bullseye dampers and butterfly dampers, can only be made to function satisfactorily by using an expensive time actuating means which causes them to operate in a relatively slow manner. Even so, butterfly dampers are particularly difficult to use because the fluid flow rate does not change linearly with respect to the change in position of the damper blade as most of the fluid is controllable when the damper blade moves to a position substantially parallel to the direction of flow of the fluid. Less objectionable is the bullseye damper since its flow rate changes linearly over the entire damper blade stroke.

In order to provide a control arrangement for a damper to selectively control the opening and closing of a flow-through orifice to provide a selectively buffered transition in a system when starting or stopping the flow of fluid therethrough, U.S. Pat. No. 3,898,997 has been proposed utilizing electrical actuating means to actuate the damper means for movement of the damper blade from one position to another. In this reference, when the damper blade is in an open position, a solenoid is required to be energized. Furthermore, when the device taught by the reference is used in combination with a filter system utilizing a baghouse and the damper assembly is disposed in a inlet air system to the baghouse, when a compartment is being cleaned the damper is closed and one solenoid is de-energized, but a second solenoid is required to be energized. When putting the system back onstream and a soft-inflate is required, the one solenoid is energized and the second solenoid is de-energized until a preselected distance or preselected period of time has been satisfied. Then, the energized solenoid is de-energized. After the cycle is ready to end the low flow rate, the de-energized solenoid is then re-energized to open the damper and remains in the energized position during the normal operation of the system.

SUMMARY OF THE INVENTION

In the present invention, it is recognized that it is desirable to provide a damper control arrangement for selectively controlling the opening and closing of a flow-through orifice and it is further recognized that it is desirable to provide a damper control arrangement which is straightforward, inexpensive, readily constructed and easily maintained.

The present invention advantageously provides a straightforward arrangement for a damper control arrangement which includes means to control the opening and closing of flow-through an orifice. The present invention further provides a damper control arrangement which is inexpensive, sturdy, easy and quickly operable and yet effective during operating conditions. The present invention even further provides a damper control arrangement which is useful where, for example, the gentle inflation if a gas filter bag, as it is being put onstream utilizes solenoid valves to maintain the damper in its fully closed position when said solenoids are energized and a fully open or normal operating condition when both solenoids are de-energized and at intermediate holding positions of the damper assembly, one solenoid is energized and another solenoid is de-energized.

Various other features of the present invention will become obvious to those skilled in the art upon reading the disclosure set forth hereinafter.

More particularly, the present invention provides a damper control arrangement comprising: a housing wall having an orifice therein; a damper blade movably positioned selectively between at least one open position and a closed position in relation to the orifice; damper blade moving means in communication with the damper blade for moving the damper blade relative to the housing wall; acutating means operable to actuate the damper blade moving means for movement of the damper blade from one position to another, the actuating means including control means for the damper blade moving means actuated in response to a first control circuit and a second control circuit wherein the first control circuit includes means for de-energizing the actuating means to a position to cause the selective opening of the orifice by moving the damper blade a preselected distance, means for energizing the acutating means once the damper blade has traveled a preselected distance, and a timing device arranged to maintain the damper blade at the preselected distance for a preselected period of time before the actuating means is de-energized whereby the damper blade is actuated to move to a second open position; and, the second control circuit includes means for energizing the actuating means to a position to cause the closing of the damper blade.

Even more particularly, the present invention provides a damper control arrangement comprising a housing wall having an orifice therein; a damper blade movably positioned selectively between at least one open position and a closed position in relation to the orifice; damper blade moving means in communication with the damper blade for moving the damper blade relative to the housing wall; actuating means operable to actuate the damper blade moving means for movement of the damper blade from one position to another, the actuating means including control means for the damper blade moving means actuated in response to a first control circuit and a second control circuit wherein (1) the first control circuit includes a normally open switch means closed to a first position, the switch means in the first closed position being in series with two branch circuits in parallel, the first of the branch circuits including a normally open first contact switch and a first contactor actuating means whereby the first contactor actuating means actuates the actuating means to a first position upon closing the normally open first contact switch, the second of the branches including a normally open limit switch and a first contact relay which operates the normally open first contact switch, the normally open limit switch being operable in response to selected movement of the damper blade whereby when the damper blade moves a preselected distance the limit switch is actuated to a closed position thereby energizing the contact relay which closes the normally open first contact switch, actuating the first contactor actuating means which in turn actuates the actuating means to its original position; and, (2) the second control circuit includes the normally open switch means closed to a second position, the first contactor actuating means and a second contactor actuating means whereby the first and second contactor actuating means actuates the actuating means to a second position upon closing the normally open switch means to the second position.

BRIEF DESCRIPTION OF THE DRAWINGS

A better understanding of the present invention will be had upon reference to the following specification and accompanying drawings wherein like numerals refer to like parts throughout and in which.

DETAILED DESCRIPTION OF THE PREFERRED EMBODIMENT

Figure 1:
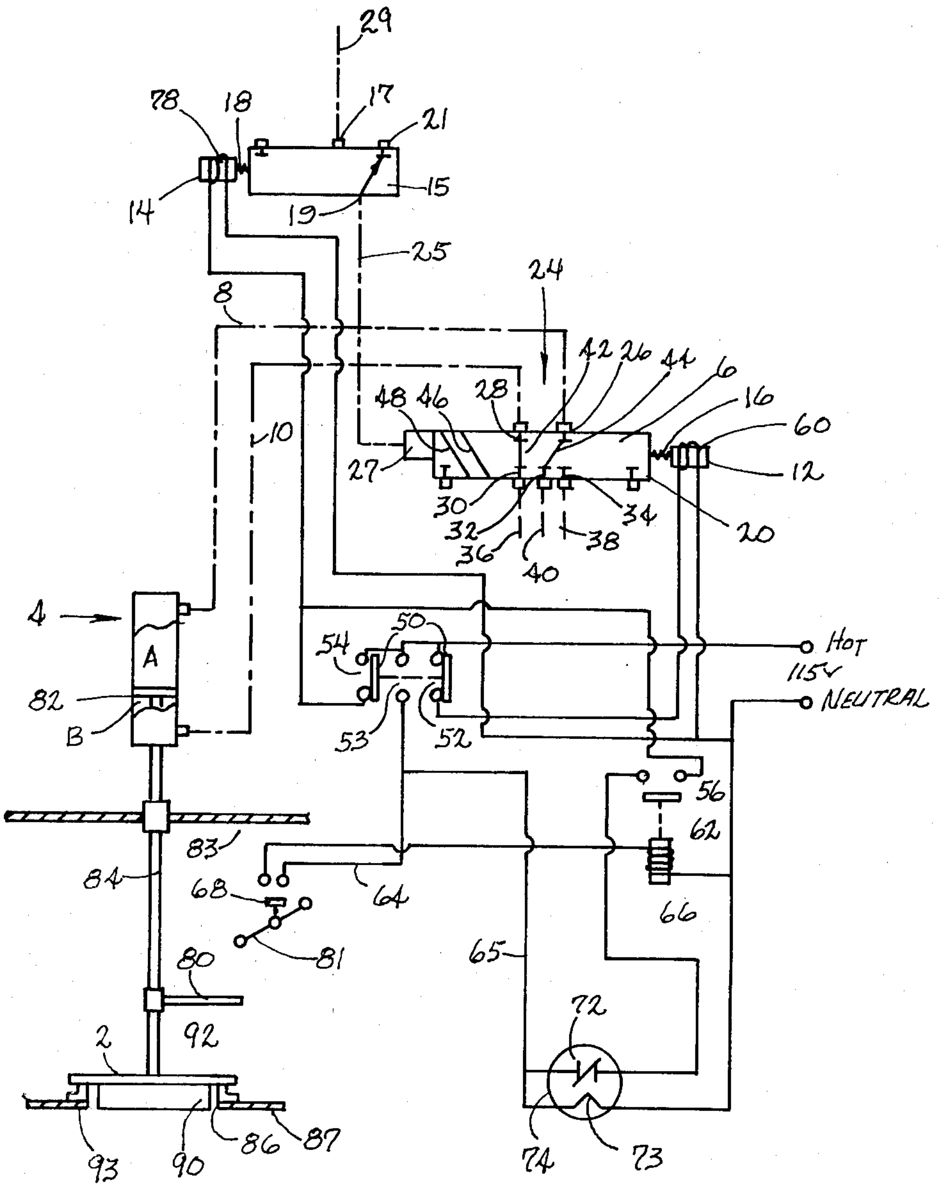
FIG. 1 is a schematic representation of the damper control arrangement of the present invention with the damper completely closed.

The Figures illustrate the structure of a damper assembly 2 operable in response to the operation of the damper blade moving means, exemplified as fluid cylinder 4, the fluid being generally either hydraulic or pneumatic. However, it is realized that the damper blade moving means may be other mechanical means such as a motorized drive with appropriate gearing. The flow of fluid for operation of the fluid cylinder 4, as exemplified, is controlled by the actuating means, exemplified as a single coil, three positions spring return to center, and remote air pilot operated solenoid valve means 6 which is adapted to control the supply fluid to compartment A of the cylinder 4 through line 8 and into the other compartment, compartment B, of the fluid cylinder 4 through appropriate conduit piping 10, the compartments A and B of cylinder 4 defined by the position of piston means 82 of the fluid cylinder 4, to be discussed hereinafter.

Supply of fluid to the fluid cylinder 4 is determined by the position of the slidable valve position 20 of the valve means 6 in response to the operation of the coil solenoids 12 and 14. Solenoids 12 and 14 include biasing means 16 and 18, respectively, whereby upon energization, the positioning of the slidable valve portion 20 which is disposed within the housing 24, determines which conduits supplies fluid to the selected compartment of the cylinder 4, as discussed hereinafter. It is also realized that the exemplified actuating means 6 may be, for example, a reversible starter if the damper moving means 4 is, for example, a motorized drive with appropriate gearing. It will become apparent to those skilled in the art that even further substitutions may be made with actuating means from the damper moving means which are operable in response to electrical circuitry, which will be discussed hereinafter, without departing from the scope and spirit of the present invention.

The valve means 6 includes five flow-through openings 26, 28, 30, 32, and 34 therein in the housing portion 24. Openings 26 and 28 communicate with conduits 8 and 10, respectively, openings 30 and 34 are in communication with exhaust conduits 36 and 38 respectively, and opening 32 is in fluid communication with a fluid supply source conduit 40, conduit 40 supplying the pressurized fluid to the fluid cylinder 4 by means of the valve means 6. Solenoid 14 including biasing means 18, is further provided with slidable valve portion 15 which includes three flow-through openings 17, 19 and 21 therein. Opening 17 communicates with a fluid supply conduit 29, conduit 29 supplying the pressurized fluid to a fluid cylinder 27 by means of the valve means 15 and conduit 25. When solenoid 14 is energized, opening 21 is in flow-through alignment with conduit 25 to exhaust the pressurized fluid from the fluid cylinder 27. When solenoid 14 is de-energized, opening 19 is in flow-through alignment with conduit 25 thereby supplying pressurized fluid from the supply source conduit 29 flow-through opening 17 to the fluid cylinder 27.

Figure 3:
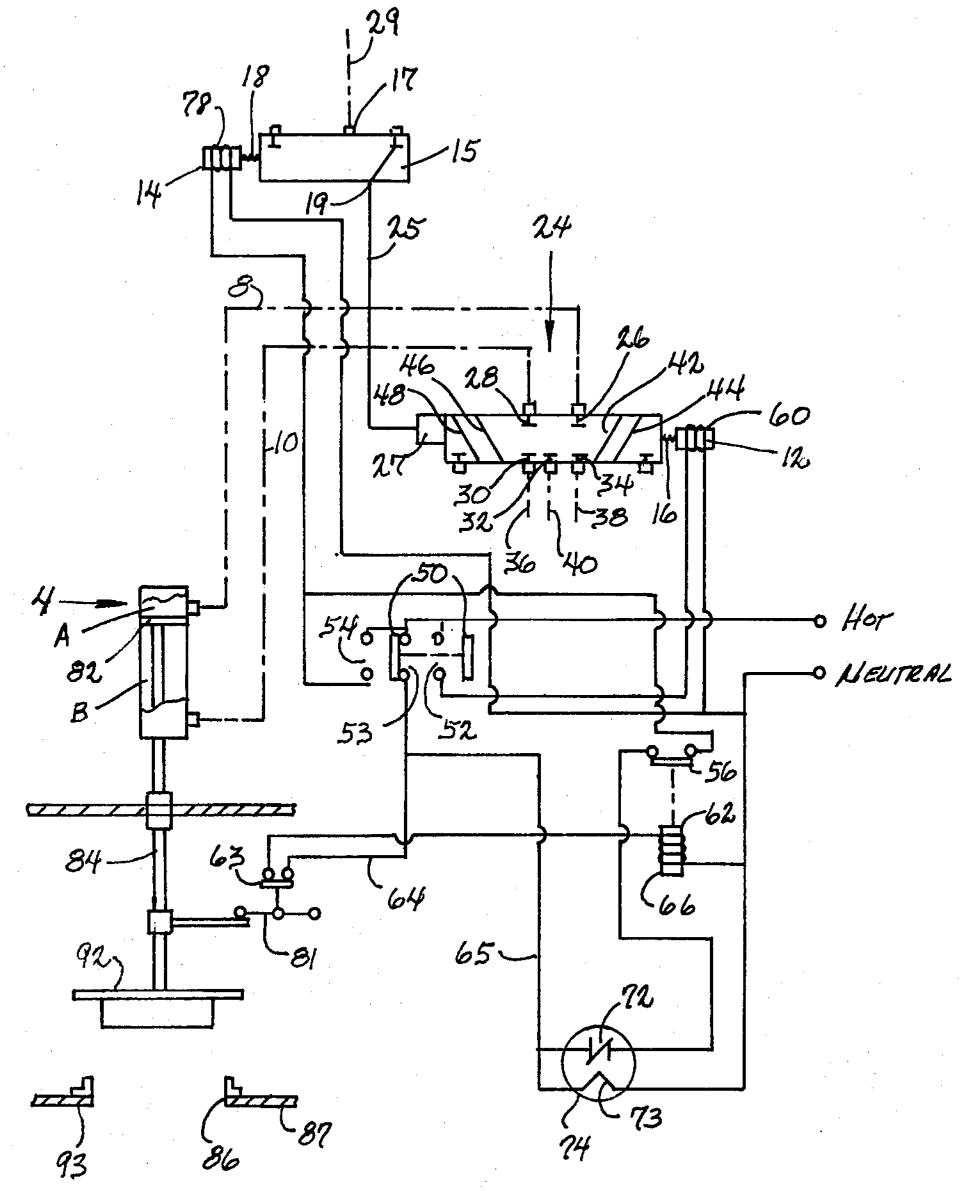
FIG. 3 is a schematic representation of the damper control arrangement of the present invention with the damper in the partially open position.

It is noted that when solenoids 12 and 14 are de-energized a flow-through passage 48 is aligned for flow-through communication with conduit 40, the supply ffluid conduit, and conduit 10 with flow-through passage 46 being aligned between openings 26 and 34 to provide for the exhausting of the fluid from the fluid cylinder 4 through fluid conduit 8 and the exhaust conduit 38. Energization of solenoids 12 and 14 urges valve portion 20 to a position within valve means 6 so that flow-through passage 44 is aligned with opening 32 and opening 26 thereby providing fluid from conduit 40 to the fluid cylinder 4 through fluid conduit 8 with flow-through opening 42 being aligned with openings 28 and 30 providing for flow-through communication between conduit 10 and exhaust line 36. When solenoid 12 is de-energized and solenoid 14 is energized, the slidable valve portion 20 is locked in its original position, as illustrated in FIG. 3, and all openings to the valve means 6 are closed off.

The solenoids 12 and 14 are energized through electrical circuitry hereinafter referred to as first and second control circuits. Each of the circuits include the three-way main control circuit switch 50, the first control circuit being energized by actuating main control circuit switch 50 to a closed position at contact 53 and the second control circuit being energized by actuating main control circuit switch 50 to a closed position at 52 and 54.

The first control circuit is comprised of two branch circuits hereinafter referred to as a first branch circuit and a second branch circuit.

The first branch circuit comprises, in series, the 3-way main control circuit switch 50 closed against contact 53, a normally closed contact switch 72, a normally open contact relay switch 56, and first actuating means such as a solenoid coil winding 78 for actuating the solenoid 14. In addition, the first branch circuit includes, in parallel with the normally closed contact switch 72, a timing device 74 having a timing element 73. The normally closed contact switch 72 is operable in response to energization of the timing element 73.

The second branch circuit comprises, in series, the 3-way main control circuit switch 50 closed against contact 53, a normally open limit switch 68, and a contact relay 62 having winding 66. The normally open contact relay switch 56 is operable in response to energization of the contact relay 62.

With reference to the first and second branch circuits of the first control circuit, when the control switch 50 is closed across contacts 53 with the normally open limit switch 68 closed energizing the contact relay 62 which closes the normally open contact relay switch 56, and the normally closed contact switch 72 is closed, the coil 78 of the solenoid 14 is energized and the timing element 73 is energized. After a preselected period of time, the timing element 73 times out opening the normally closed timing switch 72 causing de-energization of the coil 78 of the solenoid 14.

Likewise, when the normally open limit switch 68 is open, the contact relay 62 de-energized thus opening the normally open contact switch 56 causing de-energization of the coil 78 of the solenoid 14.

The second control circuit comprises a first solenoid actuating circuit for actuating solenoid 14 and a second solenoid actuating circuit for actuating solenoid 12. The first and second actuating circuits are always concurrently actuated.

The first solenoid actuating circuit comprises, in series, the control switch 50 closed across contacts 54, and the solenoid coil windings 78 of solenoid 14.

The second solenoid actuating circuit comprises, in series, the control switch 50 closed across contacts 52, and the solenoid coil windings 60 of solenoid 12.

When the main control switch 50 is closed across contacts 52 and 54, solenoids 12 and 14 are energized.

The energization of solenoid 14 causes the slidable valve portion 15 to move placing flow-through opening 21 in fluid communication with flow-through openings 19 thereby allowing pressurized fluid to flow through conduit 25 from fluid cylinder 27, thereby relieving the pressure on cylinder 27. The energization of solenoid 12 causes the slidable valve portion 20 to move placing flow-through passage 44 in alignment with openings 32 and 26 thereby providing fluid flow from conduit 40 to pass through line 8 to chamber A of the cylinder 4, and placing flow-through opening 42 in alignment with openings 28 and 30 providing fluid flow from the chamber 13 of cylinder 4 through line 10 to exhaust through line 36. The damper assembly 2 is thus forced to move to a closed position as indicated by the solid lines in FIG. 1.

In the first electrical control circuit, the normally open limit switch 68 is operable in response to movement of transversely extending arm 80 which is fixedly attached to the connecting rod 84, connection rod 84 being disposed between and fixedly attached to the damper assembly 2 at one end and the piston 82 at the other for slidable movement through and in fluid tight relation with an opening in housing 4. Movement of arm 80 against and in contacting relationship with the limit switch contacting arm 81 actuates the limit switch 68 to a closed position thereby energizing the first electrical control circuit as discussed previously.

In the FIG. 1 the damper blade 92 is shown in a closed position in fluid tight relationship with seal 93 which surrounds orifice 86 and plate 87. Blade 92 is held in position and supported by support frame 85 and connecting rod 84 connecting blade 92 to piston 82 within cylinder 4. Cylinder 4 is generally a pneumatic or hydraulic cylinder actuated, as described previously, by control valve 6 and supported by support frame 85 outside of the fluid passageway. A cylindrical projection 90 is attached on the orifice side of damper blade 92 to provide a fluid passageway of constant cross sectional area during a preselected portion of the stroke of the damper blade 92. During a preselected period of the damper blade stroke cylindrical projection 90 is passed through orifice 86 thereby defining an annular opening between the sidewalls and orifice 86. Also, as can be seen from the Figure, during initial stages of opening of the damper assembly 2, damper blade 92 will be moved upwardly from its fluid tight position on the seal 93. When this happens, cylindrical projection 90 remains in juxtaposition with orifice 86 and a constant flow of fluid will be allowed to pass through damper assembly 2 between the annular space defined between the cylindrical projection 90 and the plate defining orifice 86. Cylindrical projection 90 therefore acts as a buffer which in effect provides for a smooth transition, for example, cloth filter bags are being returned onstream after cleaning. In normal operation, for example, with the baghouse including a plurality of cloth filter bags, the amount of initial opening of the orifice 86 is only one or two inches before the contact arm 81 is contacted by the transversely extending arm 80 which stops the movement of the damper assembly 2. It is further realized that in close control of the damper blade away from the orifice 86 is a cylindrical portion 90 is not necessary.

As a starting point in the discussion of the operation of the damper control arrangement, (see FIG. 1), let us assume that the solenoids 12 and 14 are both energized. Energization of the solenoids 12 and 14 has been caused by the three-way main control circuit switch 50 moving into contact with contacts 52 and 53. The movement of the three-way main control cirucit switch 50 is controlled by other automatic operations which are not part of the present invention and, therefore, not discussed, or it could be manually operated if so desired. With solenoid 14 energized the slidable valve portion 15 moves placing the flow-through opening 21 in fluid flow communication with flow-through opening 19, thus, establishing a path for exhausting pressurized fluid from the fluid cylinder 27 of solenoid 12 through conduit 25. With the fluid cylinder 27 de-pressurized the energized solenoid 12 moves the slidable valve portion 20 placing flow-through passage 44 into alignment with flow-through openings 26 and 32, thus, placing chamber A of cylinder 4 in fluid flow communication with the pressurized fluid supply conduit 40 through line 8 resulting in the pressurization of chamber A. Concurrently, flow-through passage 42 is placed in alignment with flow-through openings 28 and 30, thus, placing chamber B of cylinder 4 in flow communication with the exhaust conduit 36 through line 10 resulting in the de-pressurization of chamber B. The pressurized chamber A causes the piston 82 to move downwardly into the de-pressurized chamber B. In so doing, the piston 82, connected to the damper assembly 2 by connecting rod 84, holds the damper assembly closed with the damper blade 92 seated against seal 93. The normally closed contact switch 72 remains closed and the normally open limit switch 68 also is open.

Figure 2:
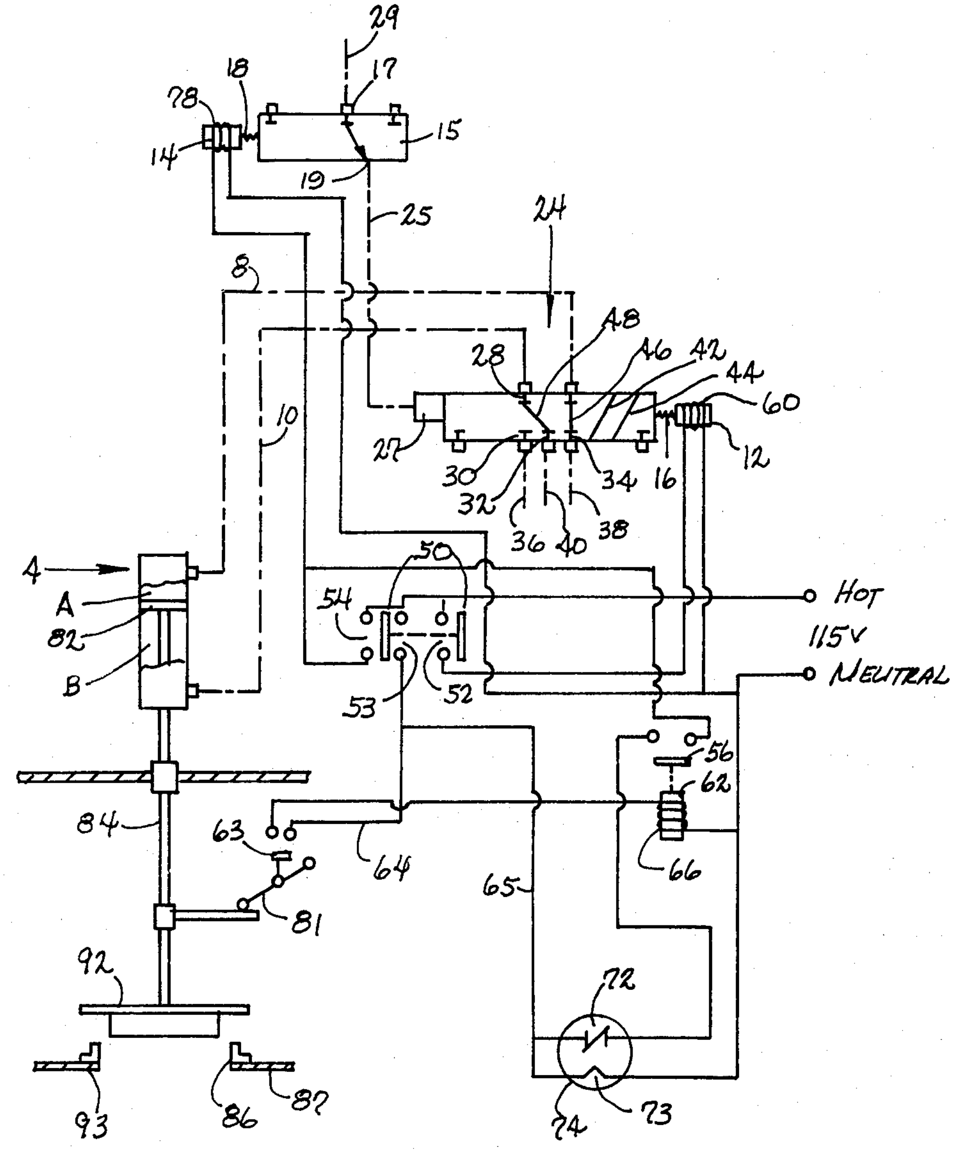
FIG. 2 is a schematic representation of the damper control arrangement of the present invention with the damper moving from the closed position of FIG. 1 toward a partially open position.

Next, (see FIG. 2), the control circuit switch is caused to move out of contact with contacts 52 and 53 so that contacts 52, 53, and 54 are open. Again, control circuit switch 50 is controlled by other automatic operations, or can be controlled manually. This opens the circuit to solenoids 12 and 14 causing them to become de-energized. When solenoid 14 is de-energized, the biasing means 18 forces the slidable valve portion 15 to move placing the flow-through opening 17 in fluid flow communication with the flow-through opening 19, thus, establishing a path for pressurized fluid from supply source conduit 29, through the conduit 25 to the fluid cylinder 27 to pressurize it. With solenoid 12 de-energized, the pressurized fluid cylinder 27 causes the slidable valve portion 20 of the solenoid 12 to move placing the flow-through passage 48 in alignment with flow-through openings 28 and 32, thus, placing chamber B of cylinder 4 in flow communication with pressurized flow supply conduit 40 through line 10 resulting in the pressurization of chamber B. Concurrently, flow-through passage 46 is placed in alignment with flow-through openings 26 and 34, thus, placing chamber A of cylinder 4 in flow communication with exhaust conduit 38 through line 8 resulting in the de-pressurization of chamber A. The pressurized chamber B causes the piston 82 to begin moving upwardly into the de-pressurized chamber A. In so doing, the moving piston 82, connected to the damper assembly 2 by means of connecting rod 84, starts the damper assembly 2 moving toward the open position lifting damper blade 92 from the seal 93.

As the piston 82 continues to move, (See FIG. 3), at a predetermined point the transverse arm 80 contacts and moves limit switch contacting arm 81 causing the normally open limit switch 68 to close. Concurrently, contact switch 50 is caused to close contact 53. With limit switch 68 closed, coil 62 in the second branch circuit becomes energized causing normally open contact switch 56 to close. As previously mentioned, contact switch 50 is controlled by other automatic operations which are not part of the present invention, or it could be manually operated if desired. With contact 53 and contact switch 56 closed, the solenoid 14 is energized. The energized solenoid 14 causes the slidable valve portion 15 to shift moving the flow-through opening 21 into fluid flow communication with flow-through opening 19, thus, establishing a path for exhausting pressurized fluid from the fluid cylinder 27. With solenoid 12 de-energized and fluid cylinder 27 de-pressurized, the biasing means 16 of solenoid 12 moves the slidable valve portion 20 to a position wherein all of the fluid flow passages 42, 44, 46 and 48 are out of alignment with the flow-through openings 26 and 28, and in effect, closing flow-through openings 26 and 28. In this mode, pressurized fluid is trapped in chamber B, and the piston 82 stops moving. At the same time, the closing of contact 53 activates the timing device 74. At this point, the damper assembly 2 is in a partially open position with damper blade 92 removed from seal 93 and cylindrical portion 90 defining an annular space between the cylindrical portion 90 and plate defining orifice 86.

Figure 4:
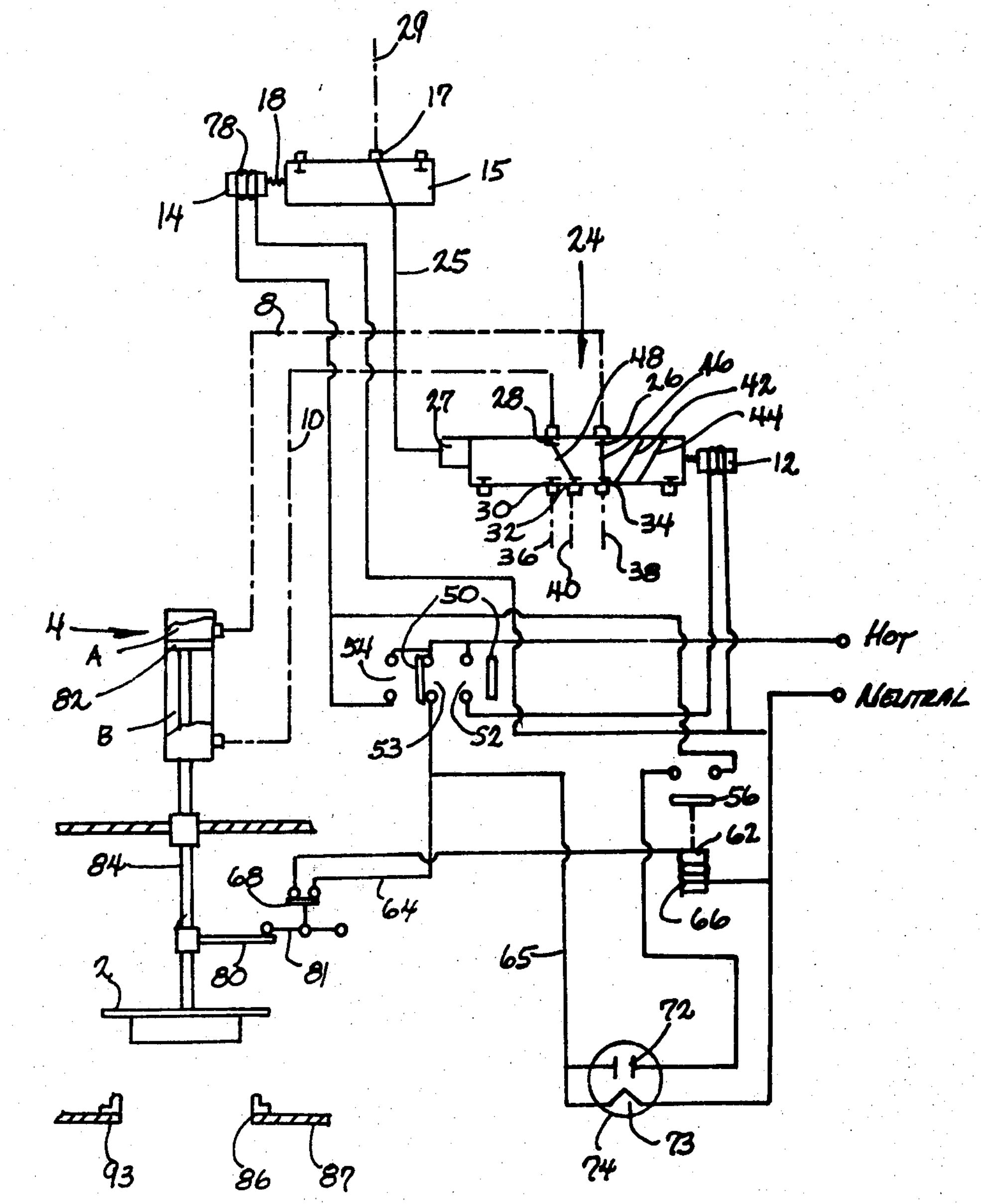
FIG. 4 is a schematic representation of the damper control arrangement of the present invention with the damper moving from the partially open position of FIG. 3 to a fully open position; and, FIG. 5 is a schematic representation of the damper control arrangement of the present invention with the damper in the fully open position.

After a predetermined time, the timing element opens the normally closed contact switch 72 causing solenoid 14 to become de-energized (See FIG. 4). With the solenoid 14 de-energized, the biasing means 18 moves the slidable valve portion 15 to place the flow-through opening 17 in fluid flow communication with the flow-through opening 19, thus, establishing a path for pressurized fluid from supply source conduit 29, through the conduit 25 to the fluid cylinder 27 to pressurize. With the solenoid 12 de-energized, the pressurized fluid cylinder 27 causes the slidable valve portion 20 of the solenoid 12 to move placing the flow-through passage 48 in alignment with flow-through openings 28 and 32, thus, placing chamber B of cylinder 4 in flow communication with pressurized fluid supply conduit 40 through line 10 resulting in the pressurization of chamber B. Concurrently, flow-through passage 46 is placed in alignment with flow-through openings 26 and 34, thus, placing chamber A of cylinder 4 in fluid flow communication with exhaust conduit 38 through line 8. The pressurized chamber B causes the piston 82 to resume movement upwardly into chamber A and in so doing, moves damper assembly 2 from the partially open position to the full open position.

Figure 5:
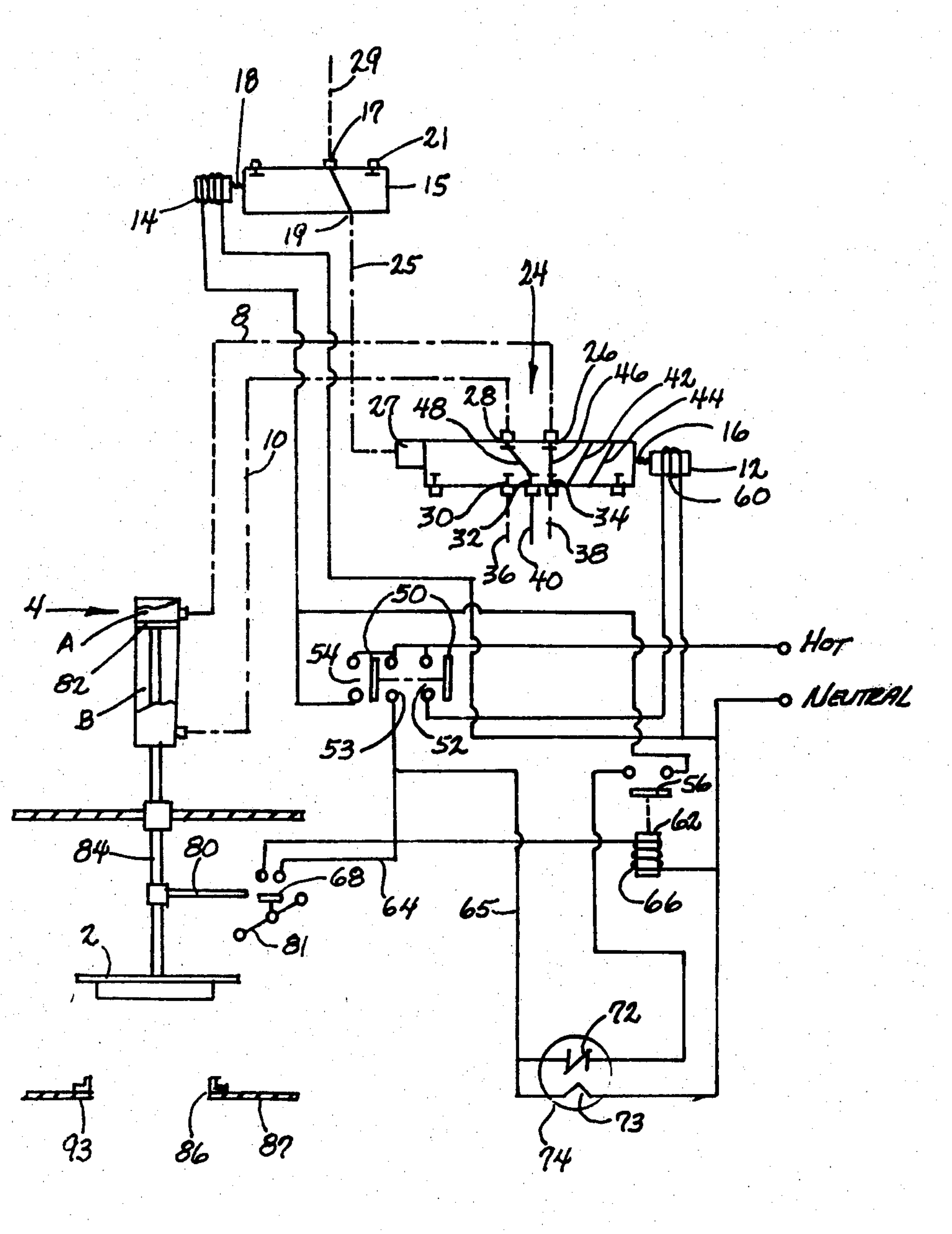

As the piston 82 moves to a position corresponding to a full or second open position of the damper assembly 2; (See FIG. 5), the transverse arm 80 affixed to the connecting rod 84 moves upwardly past and out of contact with the limit switch contacting arm 81, releasing the switch contacting arm and allowing the limit switch 68 to assume its normally open position. The opening of the limit switch 68 causes the contact relay 62 to de-energize thereby allowing the normally open contact switch 56 to open, and allows the normally closed contact switch 72 to close. At the same time, with the opening of limit switch 68 the control switch 50 is caused to move, either manually or by other automatic operations previously mentioned, opening the contact 53, the contacts 52, and 54 remaining open. The solenoids 12 and 14 remain de-energized so that chamber B of cylinder 4 is continuously supplied with pressurized fluid while chamber A is in fluid flow communication with exhaust conduit 38. Thus, the damper assembly 2 is held in the full open position under the influence of pressurized fluid with the solenoids 12 and 14 de-energized.

Upon a signal from the other automatic operations of the system previously mentioned, or manually if so desired, the contacts 52 and 54 of the three-way main control circuit switch are closed energizing solenoids 12 and 14. (See FIG. 1) Energization of solenoid 14 causes slidable valve portion 15 to move placing the flow-through opening 21 in fluid flow communication with flow-through opening 19, thus, establishing a path for exhausting pressurized fluid from the fluid cylinder 27 of solenoid 12 through conduit 25. With the fluid cylinder 27 de-pressurized, the energized solenoid 12 moves the slidable valve portion 20 placing flow-through passage 44 into alignment with flow-through opening 26 and 32, thus, placing chamber A of cylinder 4 in fluid flow communication with the pressurized fluid supply conduit 40 through line 8 resulting in the pressurization of chamber A. Concurrently, flow-through passage 42 is placed in alignment with flow-through openings 28 and 30, thus, chamber B of cylinder 4 in fluid flow communication with exhaust conduit 36 through line 10 resulting in the de-pressurization of chamber B. The pressurized chamber A causes the piston 82 to move downwardly into de-pressurized chamber B and in so doing causes the damper assembly 2 to move to the full closed position with damper blade 92 in sealing contact with seal 93 and the above-discussed sequence begins over again upon a proper demand from the other automatic operations which causes contacts 52 and 54 of three-way main control circuit switch 50 to close, or if desired upon manually closing of these contacts.

It is realized that the damper assembly may take on other shapes and structures, such as those described in U.S. Pat. No. 3,752,439. However, it is noted that in the utilization of the damper assembly 2, as previously described, a variable orifice is defined during the upper movement of the damper assembly 2. The varying orifice is then stopped at a preselected distance or partially open position, in relation to the opening 86 in wall 87. The preselected damper assembly 2 remains in this partially open position for actuating means becomes operable and forces the damper assembly 2 to its fully open position.

It will be realized that various changes may be made to the specific embodiment shown and described without departing from the scope and principals of the present invention.

I claim:

1. A damper control arrangement for controlling the movement of a damper relative to a flow-through orifice, the damper control arrangement comprising:

damper moving means operatively associated with said damper for moving said damper relative to said orifice;

actuating means operable to activate said damper moving means for movement of said damper blade from one position to another, said actuating means including a first and a second solenoid for controlling said damper blade moving means actuated in response to a first control circuit and a second control circuit wherein:

(1) said first control circuit comprises two branch circuits, (a) the first branch circuit comprising, in series, a three-way control switch closed across a first contact, a normally closed contact switch, a normally open contact relay switch and a first solenoid, and a timing device in parallel with the normally closed contact switch; and (b) the second branch circuit comprising, in series, the three-way control switch closed across said first contact, a normally open limit switch and a contact relay;

with the control switch closed across the first contact and the normally open limit switch closed, the contact relay is energized closing the normally open contact relay switch and the normally closed contact switch remains in its normally closed position resulting in the electrical energization of the first solenoid and the timing element;

(2) said control circuit comprises a first solenoid actuating circuit for energizing the first solenoid and a second solenoid actuating circuit for energizing the second solenoid wherein:

(a) the first solenoid actuating circuit comprises, in series, the first solenoid and the three-way control switch closed across a second contact; and, (b) the second solenoid actuating circuit comprises, in series, the second solenoid and the three-way control switch closed across a third contact; the three-way control switch concurrently with the closure of the three-way control switch across the second contact.

* * * * *